A. G. HOEFLER & K. W. SCHANTZ.
ICE CREAM FREEZER.
APPLICATION FILED NOV. 21, 1906.

921,837.

Patented May 18, 1909.
3 SHEETS—SHEET 1.

Witnesses:
Louis W. Gratz.
Richard Sommer.

Inventors
A. G. Hoefler
K. W. Schantz
by Geyer & Popp
Attorneys.

A. G. HOEFLER & K. W. SCHANTZ.
ICE CREAM FREEZER.
APPLICATION FILED NOV. 21, 1906.
921,837.
Patented May 18, 1909.
3 SHEETS—SHEET 2.
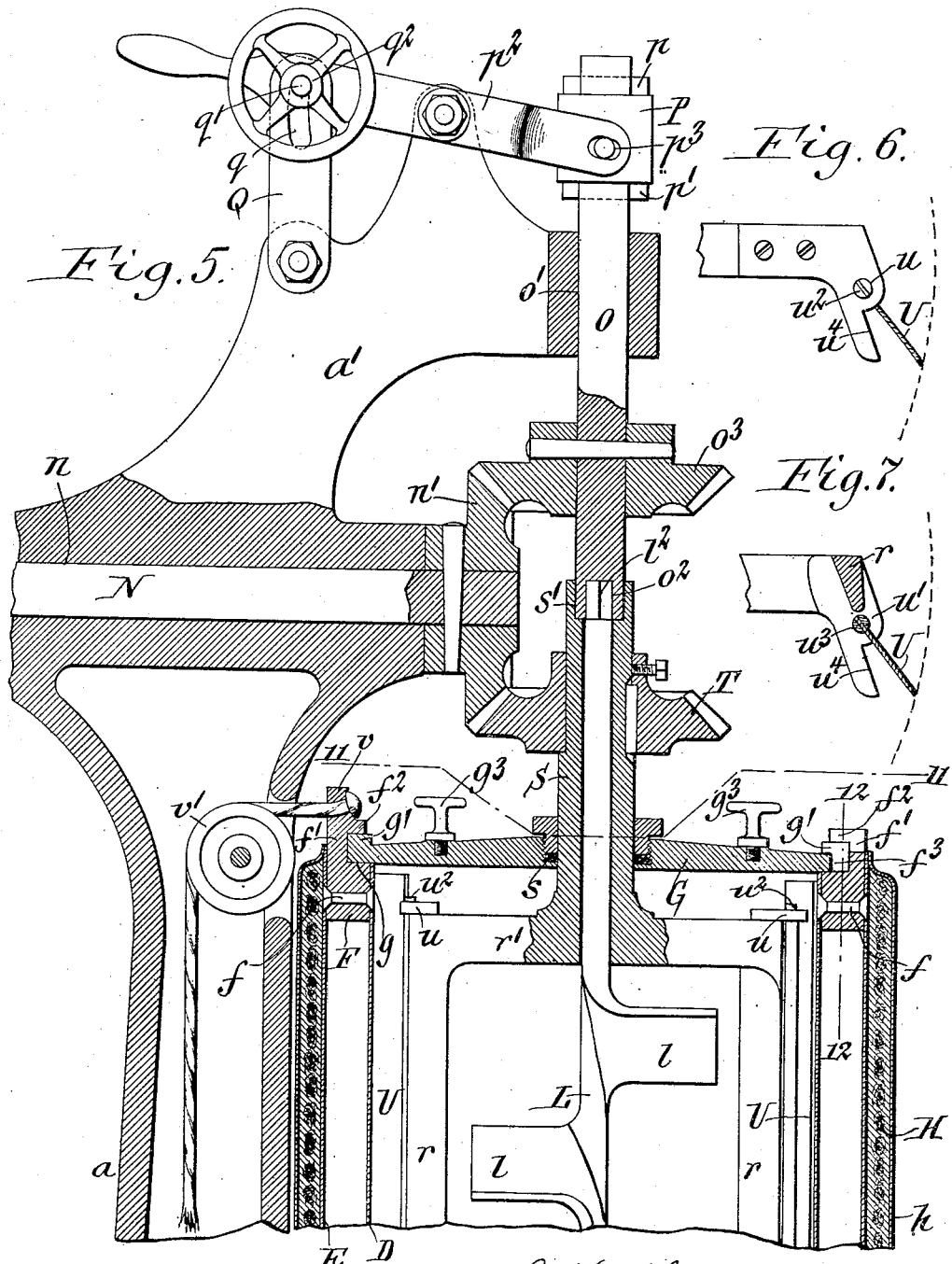

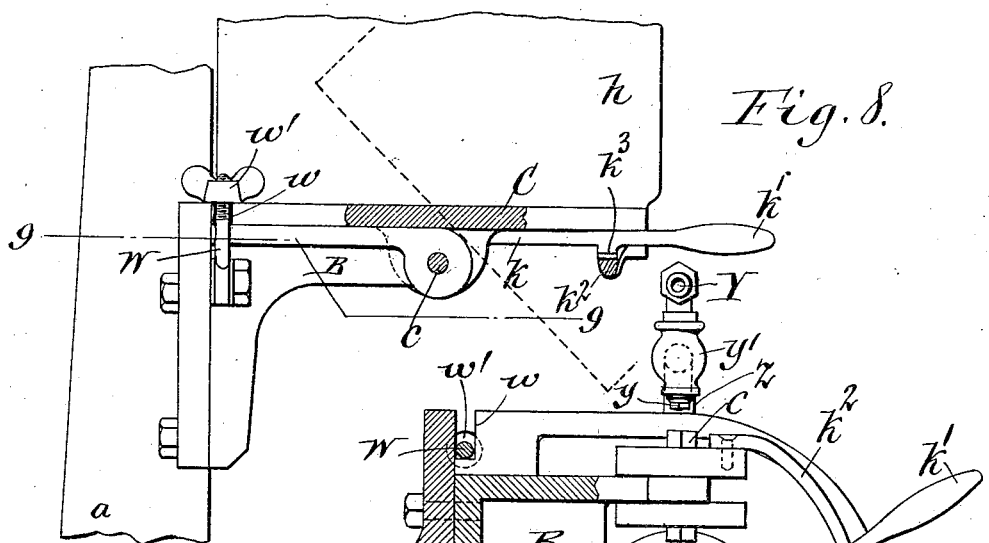
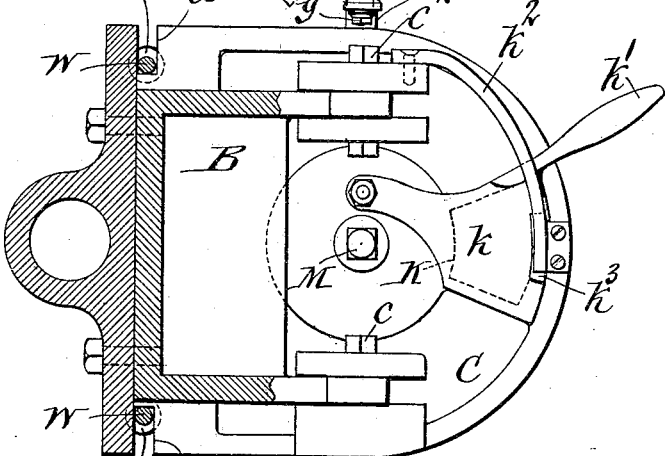
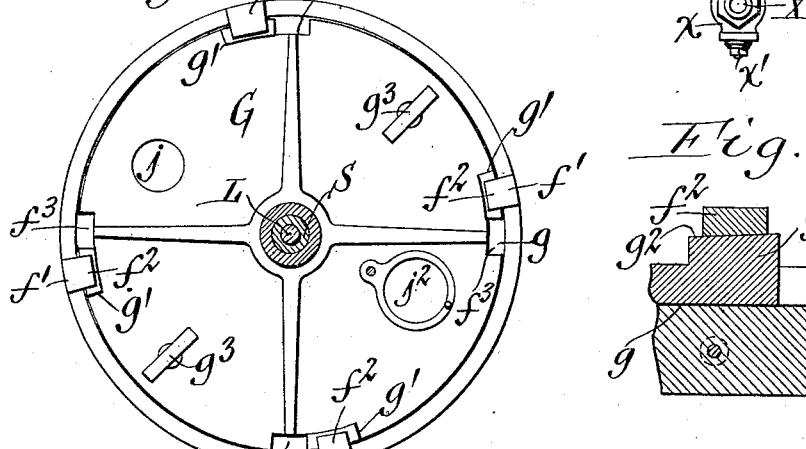
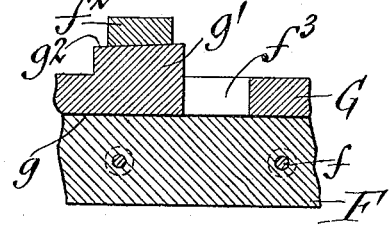
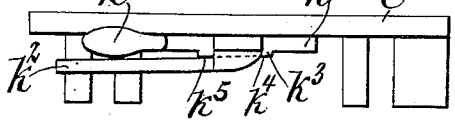

UNITED STATES PATENT OFFICE.

ALEXANDER G. HOEFLER AND KARL W. SCHANTZ, OF BUFFALO, NEW YORK.

ICE-CREAM FREEZER.

No. 921,837.      Specification of Letters Patent.      Patented May 18, 1909.

Application filed November 21, 1906. Serial No. 344,364.

*To all whom it may concern:*

Be it known that we, ALEXANDER G. HOEFLER and KARL W. SCHANTZ, citizens of the United States, residing at Buffalo, in the county of Erie and State of New York, have invented a new and useful Improvement in Ice-Cream Freezers, of which the following is a specification.

This invention relates more particularly to that class of ice cream freezers which are driven by power and in which the refrigeration is effected by circulating brine or similar medium through a jacket which surrounds the cream receptacle.

The object of this invention is to produce an ice cream freezer of this character which has large capacity, which can be readily assembled for use or dismembered for cleaning, which can be quickly emptied of its frozen contents and securely closed for confining the material to be frozen in the freezing chamber and which has the connection between the refrigerating jacket and the brine supply and discharge pipes so constructed that the cream can and connecting parts may be tilted for cleaning and other purposes without interrupting the flow of the brine.

Figure 1:
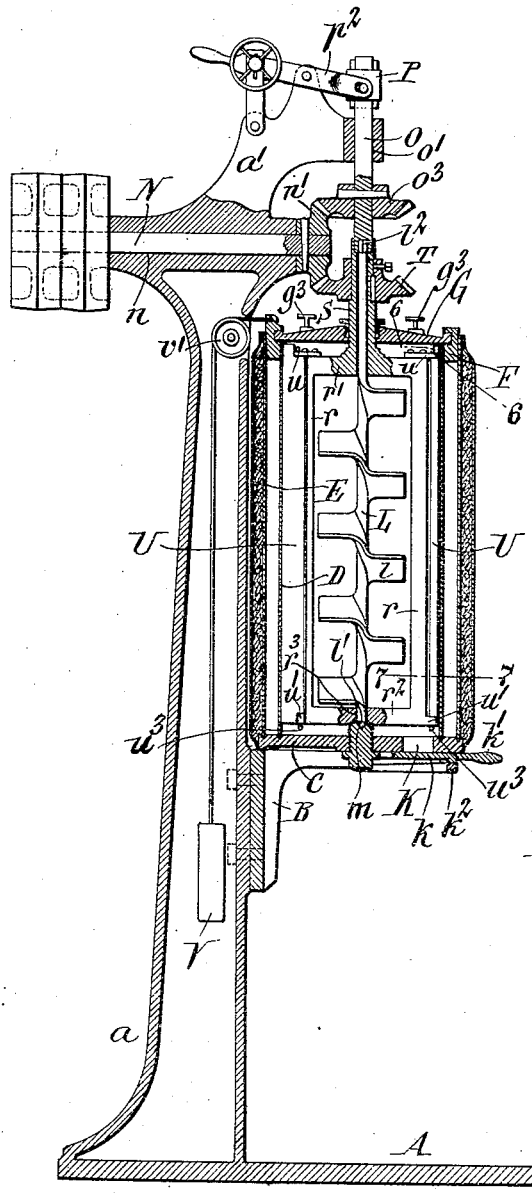
Figure 2:
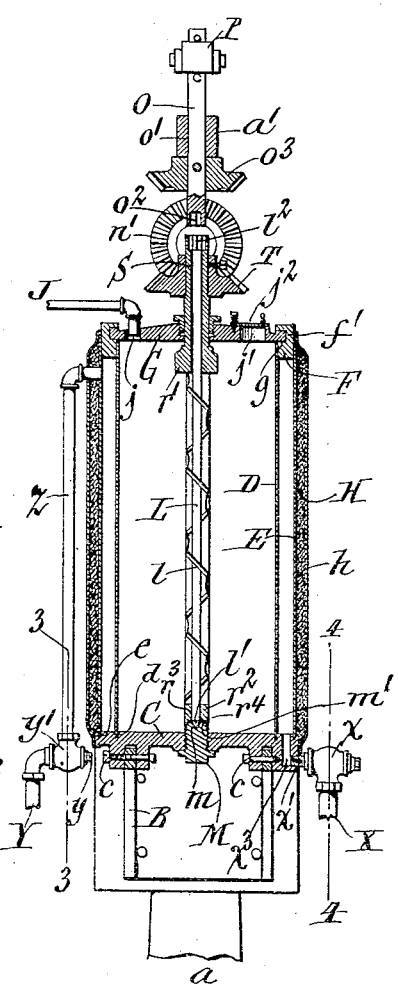
Figure 3:
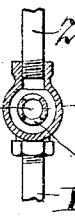
Figure 4:
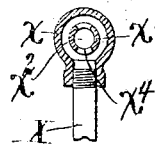

In the accompanying drawings consisting of three sheets: Figure 1 is a vertical longitudinal section of our improved ice cream freezer showing the position of the parts when the freezer is in use. Fig. 2 is a vertical cross section thereof taken centrally through the cream can and showing the driving mechanism in its uncoupled position. Figs. 3 and 4 are vertical sections, on an enlarged scale, in lines 3—3 and 4—4, Fig. 2, respectively, and showing the swing joints or rotary couplings which connect the brine supply and discharge pipes with the refrigerating jacket. Fig. 5 is a fragmentary vertical section, on an enlarged scale, of the upper part of the ice cream freezer, the position of the parts corresponding to that shown in Fig. 1. Figs. 6 and 7 are fragmentary horizontal sections on an enlarged scale, in lines 6—6 and 7—7, Fig. 1, respectively. Fig. 8 is a fragmentary side elevation, partly in section, of the lower part of the freezing apparatus. Fig. 9 is a horizontal section thereof taken in line 9—9, Fig. 8. Fig. 10 is a front elevation of the can and jacket bottom plate and connecting parts. Fig. 11 is a horizontal section, on a reduced scale, in line 11—11, Fig. 5. Fig. 12 is a fragmentary vertical section in line 12—12, Fig. 5.

Similar characters of reference indicate corresponding parts throughout the several views.

The main frame which supports the working parts of the machine may be variously constructed but as shown in the drawings the same consists essentially of a base A, a standard or column $a$ rising from the base, a forwardly overhanging head $a^1$ arranged at the upper end of the column or standard and an elevated bracket B projecting forwardly from the standard about midway of its height.

C represents a bottom plate which is pivotally connected on its underside by bolts $c$ or otherwise with the bracket B to permit of turning the bottom plate in a vertical plane from its normal horizontal position shown in full lines in Figs. 1 and 8 into an abnormal or forwardly tilted position, as shown by dotted lines in Fig. 8.

D represents the upright cylindrical side wall or body of the can, chamber or receptacle which receives the cream and other materials which are to be frozen. E represents the upright cylindrical wall or body of the refrigerating chamber or jacket which surrounds the cream chamber or can and through which the brine or similar medium is circulated for freezing the contents of the can. These cylindrical bodies of the cream can and brine jacket are seated at their lower ends in annular grooves $d$, $e$ in the upper side of the plate C and secured therein by brazing, or otherwise. The bottom plate thus forms a closure for the lower ends of the cream can and the brine jacket.

Between the upper ends of the bodies of the cream can and the brine jacket is arranged a ring F which may be secured thereto by rivets $f$, as shown, or otherwise so as to form a closure for the upper end of the brine jacket.

G represents a circular cover, head or disk whereby the top or upper end of the cream can or chamber is closed. This cover rests normally on an internal rabbet $g$ on the upper side of the ring F and is detachably connected with this ring so that the same may be securely held in place over the cream can during the freezing operation and as readily removed to afford access to the interior of the can for cleaning or other purposes. The means shown in the drawings for thus detachably connecting the cover with said ring consists of a plurality of hooks $f^1$ arranged on the upper side of the ring and each having an inwardly projecting or overhanging bill or beak $f^2$, a plurality of recesses or notches $f^3$ formed in the edge of the cover and a plurality of lugs $g^1$ each arranged on top of the cover adjacent to one side of one of the notches and having an inclined upper side $g^2$. In applying the cover the same is placed above the cream can with its notches in line with the bills $f^2$ and then lowered until the same rests on the rabbet, during which movement of the cover its notches pass below the bills. Upon now turning the cover about its axis in one direction the inclined upper sides of the lugs $g^1$ engage with the correspondingly inclined under sides of the bills, as shown in Figs. 5, 11, and 12, producing a wedging or clamping action whereby the margin of the cover is firmly pressed down upon the ring and the upper end of the can is tightly closed.

Handles $g^3$ are provided on the upper side of the cover to permit of conveniently manipulating the same.

The outer side of the brine jacket is preferably covered by a coat H of cork or other non-conducting or insulating material to prevent the brine from absorbing external heat which otherwise would reduce its efficiency in lowering the temperature of the contents of the cream chamber. This cork coating may be held in place by any suitable means and protected for instance by a metallic shell $h$ as shown in Figs. 1, 2, 5, and 8.

The cream or mixture to be frozen is supplied from any suitable source by a pipe J which projects downwardly into an opening $j$ in the top or cover on one side of its center.

The progress of the freezing operation may be observed from time to time through an inspection opening $j^1$ formed in the top or cover on one side of its center which opening is normally closed by a pivoted shutter $j^2$, as shown in Figs. 2 and 11, or by any other suitable means.

On one side of its center the bottom of the cream can is provided with a discharge passage or outlet K which may be opened or closed by means of a horizontally swinging gate, shutter or valve $k$ which is pivoted at its inner end on the under side of the bottom plate and provided at its outer end with a laterally projecting handle $k^1$ for manipulating the same. Underneath the outer end of the gate is arranged a guide bar or rail $k^2$ which is curved substantially concentric with the pivot of the gate and is secured at opposite ends to adjacent portions of said bottom plate. On the underside of its outer end the gate is provided with a lug $k^3$ having an inclined lower face $k^4$ which is adapted to engage with a corresponding high part or face $k^5$ on the upper side of the guide rail in the closed position of the gate for firmly pressing the gate against the seat on the bottom plate around the outlet and thus prevent leakage during the freezing operation.

The inclined faces $k^4$, $k^5$ on the gate and rail are so arranged that they only come into play during the last portion of the closing movement of the gate, greater clearance being provided between the rail and the gate in the open position of the latter, thereby permitting the gate to be opened freely and easily after the initial portion on this opening movement has been effected and still furnishing a support for the gate while open to prevent breakage of the same.

The dasher, beater, stirrer or agitator for the cream during the freezing operation consists of an upright shaft L arranged axially and centrally within the cream chamber and provided with a plurality of radial inclined blades or arms $l$. The lower end $l^1$ of the beater shaft is made downwardly tapering or conical and seated in a correspondingly shaped recess $m$ formed centrally in the upper end of a plug M which is secured in an opening in the bottom of the cream chamber by a screw joint, as shown in Figs. 1 and 2, or otherwise. The upper end of the beater shaft projects upwardly through the top of the cream can and terminates in a shank $l^2$ which is square or of other flat sided formation.

N represents the driving shaft of the machine which is journaled horizontally and lengthwise in a bearing $n$ between the upper end of the standard and its overhanging head.

O represents a vertical intermediate shaft which is arranged axially in line with the beater shaft and above the same and which is arranged to turn axially in line with the beater shaft and also sliding axially in a bearing $o^1$ at the front end of the overhanging head. The lower end of the intermediate shaft is provided with a square or flat sided socket $o^2$ which is adapted to receive the correspondingly shaped shank of the beater shaft. Above its lower end the intermediate shaft is provided with a driven bevel gear wheel $o^3$ which on its rear side is adapted to be engaged with or disengaged from the upper side of a driving bevel gear wheel $n^1$ at the front end of the driving shaft. In the lower position of the intermediate shaft its gear wheel meshes with the driving gear wheel and the socket at its lower end engages with the square shank of the beater shaft, in which position of the parts motion is transmitted from the driving shaft to the beater. Upon raising the intermediate shaft so that its gear wheel is disengaged from the driving gear wheel and its socket is disengaged from the beater shaft, as shown in Fig. 2, the driving mechanism is uncoupled from the beater. The raising and lowering of the intermediate shaft into an inoperative and operative position may be effected by a variety of means, that shown in the drawings, for example, consisting of a collar P mounted loosely on the upper end of the intermediate shaft between upper and lower shoulders $p$, $p^1$ thereon, and a hand operated shifting or rock lever $p^2$ pivoted at the upper end of the head $a^1$ and operatively connected at its forked front end with opposite sides of the collar P by a pin and slot connection $p^3$. This rock lever may be held in either position for retaining the intermediate shaft in its coupled or uncoupled position by means of a retaining bar or link Q pivoted at its lower end to the head $a^1$ and provided at its upper end with a slot $q$ which receives the shank $q^1$ of a clamping bolt on the shifting lever. When the nut $q^2$ of this clamping bolt is loose, the shifting lever $p^2$ may be freely adjusted but when this nut is tightened the link or bar is clamped between the same and the shifting lever, whereby the latter is held in place.

The mechanism for removing or scraping the cream from the inner side of the can as it becomes frozen is constructed and operates as follows: $r$, $r$ represents the upright side bars and $r^1$, $r^2$ the upper and lower cross bars of the scraper frame which rotates concentrically within the cream can. The lower bar of this frame is provided with a vertical opening $r^3$ which receives the lower end of the beater shaft and has an upwardly tapering shoulder or face $r^4$ at the lower end of said opening which rests upon the correspondingly shaped shoulder $m^1$ formed externally on the upper end of the plug M, whereby both the beater and scraper are supported by the same plug. The upper cross bar of the scraper frame is provided centrally with a hollow shaft S which receives the upper part of the beater shaft and projects upwardly through a central opening formed in the cover of the cream can.

The joint between the hollow shaft of the scraper frame and the cover of the can is tightly packed by means of a stuffing box $s$ which prevents any oil or other foreign matter from reaching the interior of the can at this point and spoiling the contents. At its upper end the hollow scraper shaft is provided with a cylindrical socket $s^1$ which is adapted to receive the correspondingly shaped lower end of the intermediate shaft in the lowered position of the latter, whereby these shafts and also the beater shaft are reliably held in a central position relatively to each other while in operation.

Between the upper side of the can cover and the upper end of the hollow beater shaft, the latter is provided with a driven bevel gear wheel T which intermeshes on its rear side with the lower side of the driving gear wheel $n^1$, thereby transmitting motion from the driving shaft to the scraper. Inasmuch as the driving gear wheel meshes on opposite sides of its center with the gear wheels of the scraper shaft and the intermediate shaft, the scraper and beater are caused to rotate in opposite directions.

U represents the scraper blades which are adapted to engage with the inner side of the cream can and which are so mounted on the scraper frame that they engage with the inner side of the cream can during the forward rotation of the scraper for removing the frozen cream therefrom but retract inwardly from the can during the backward rotation of the scraper, thereby avoiding unnecessary wear of the parts at this time. The means for thus movably supporting the scraper blades on the scraper frame consist of bearings $u$, $u^1$ arranged at the outer ends of the upper and lower cross bars, and pivots $u^2$, $u^3$ arranged at the upper and lower ends of each scraper at the inner edge thereof and journaled in the bearings on the corresponding ends of the cross bars.

The lower bearings are preferably formed integrally with the lower cross bar and receive the lower pivots of the scraper blades which project downwardly while the upper bearings are removably secured to the upper cross bar and receive the upper pivots of the blade which project upwardly. In the normal operative position of the blades the same are swung outwardly with their outer free edges in engagement with the inner side of the cream can by the action of the blades against the contents of the can during the forward rotation of the scraper. During the backward rotation of the scraper the blades are withdrawn from the inner side of the can, the movement in this direction being limited by stops $u^4$ arranged adjacent to the bearings $u$, $u^1$, whereby the blades are prevented from assuming any other position excepting that which will enable them to be automatically thrown outwardly against the can upon moving the scraper forwardly.

When it is desired to clean the freezer, the intermediate shaft is raised out of engagement from the beater and scraper shafts, thereby permitting of swinging the upper end of the cream can and connecting parts forwardly the required extent to enable the cover G to be removed, the mechanism within the can to be removed and the interior thereof to be conveniently cleaned. While thus swinging the can forwardly, the lower or scraper gear wheel T is disengaged from the driving gear wheel $n^1$ so that at this time both the scraper and the beater are uncoupled from the driving mechanism. After inserting the scraper and beater in the can and applying the cover thereto, these parts may be then swung backwardly into their normal position in which the gear wheel T engages with the driving gear wheel, and the intermediate shaft may be lowered for engaging with scraper and beater shafts and intermeshing its gear wheel with that of the driving shaft, whereby the driving connection between the latter and the beater and scraper is restored.

In order to enable the tilting movement of the cream can and connecting parts to be effected more conveniently, the same is counter-balanced by means of a weight V which is connected with a lug $v$ on the rear part of the ring F and passes over a guide pulley $v^1$ on the adjacent part of the standard. The latter is preferably made hollow and the weight is mounted to move up and down in the same.

While the cream can and other parts are in their working position, these parts are held against accidental displacement by means of a clamping or retaining device consisting preferably of rods or bolts W pivoted at their lower ends on opposite sides of the bracket B so as to be capable of swinging vertically and transversely into and out of notches $w$ in the adjacent side portions of the bottom plate, and thumb nuts $w^1$ applied to the upper threaded ends of these bolts and adapted to engage with the upper side of the bottom plate. The weight V in acting over the pulley $v^1$ to pull the can around the pivots $c$ also keeps it back to its place, additional rigidity and security being obtained by use of the swing bolts W.

For the purpose of permitting the cream can to be swung on its pivots into and out of its operative position without interfering with the connections between the brine jacket and the brine supply and discharge pipes, the following means are provided. X represents a brine supply pipe provided adjacent to the pivot of the can with the casing $x$ of a swinging joint or rotary pipe coupling. Within this casing rotates a plug $x^1$ which is secured to the adjacent part of the bottom plate and is provided with an axial passage $x^2$ which is connected with the lower end of the brine space by a conduit or passage $x^3$ in the bottom plate and it also has one or more lateral or radial passages $x^4$ which connect its axial passage with the interior of the casing $x$, thereby providing a continuous passage from the supply pipe to the lower end of the brine space or jacket. Y represents a stationary brine discharge pipe to which is secured the stationary plug $y$ of a swinging joint or rotary pipe coupling upon which turns the inclosing casing $y^1$ of said joint or coupling. The stationary plug $y$ is provided with an axial passage $y^2$ which connects at one end with the stationary outlet or discharge pipe and with one or more radial or lateral passages $y^3$ leading from its axial passage to the interior of the surrounding casing. Communication is established between the interior of the rotary casing and the upper end of the brine space or jacket by means of a pipe $z$. The swing joints or rotary couplings are arranged on opposite sides of the bottom plate and the inlet joint connects with the lower end of the brine jacket on one side thereof while the outlet joint connects with the upper end of the brine jacket at the upper end thereof. The plugs of both rotary pipe joints or couplings and the pivots connecting the cream can and bracket are all axially in line, whereby the can together with the parts mounted thereon, can be freely raised and lowered upon its pivot without disturbing the connection between its brine jacket and the brine supply and discharge pipes. Any suitable means may be employed for circulating the brine through the supply and discharge pipes and the brine jacket.

Our improved ice cream freezer owing to its vertical arrangement and compact construction occupies a minimum amount of floor space; cream in its unfrozen and frozen condition may be conveniently and quickly fed into and removed from the cream chamber and the several parts may be readily dismembered for cleaning or repairs and assembled for use.

We claim as our invention:

1. An ice cream freezer comprising a support, a bracket arranged on said support, a cream can having a normally horizontal bottom plate which is pivoted on its underside to the outer part of said bracket so as to turn in a vertical plane, and provided on opposite sides of its rear part with notches, and clamping bolts pivoted at their lower ends on said bracket so as to be capable of moving their upper ends into and out of said notches and provided with clamping nuts which are adapted to bear against the upper side of said plate, substantially as set forth.

2. An ice cream freezer comprising a support, an upright cream can having its bottom pivoted to said support to turn vertically, a refrigerating jacket surrounding said can, stationary refrigerating liquid supply and discharge pipes, a swinging or rotary joint for connecting said supply with the refrigerating jacket consisting of a casing connected with said supply pipe and a rotary plug turning in said casing and connected with said bottom and having an axial passage which communicates with the lower end of said refrigerating jacket on one side thereof and a radial passage which opens into the interior of said casing, and a swinging or rotary joint connecting said discharge pipe with the refrigerating jacket consisting of a rotary casing communicating with the upper end of said refrigerating jacket on the opposite side thereof and a stationary plug upon which said rotary casing turns and which is connected with said discharge pipe and has an axial passage communicating therewith and a radial passage opening into the interior of the casing, the axes of said swinging joints and the pivot of said can being in line, substantially as set forth.

3. An ice cream freezer comprising, a cream receptacle having an inlet in its top and an outlet in its bottom, a gate for opening and closing said outlet pivoted at its inner end on said bottom adjacent to the inner side of said opening and provided at its outer end with a handle and a downwardly projecting lug which has an inclined lower side, and a curved rail arranged below said gate and secured at its ends to said bottom and provided with a high inclined face which is engaged by the inclined face of said lug in the closed position of the gate and with a low clearance face on which the gate rests freely in the open position of the same, substantially as set forth.

Witness our hands this 17th day of November, 1906.

ALEXANDER G. HOEFLER.
KARL W. SCHANTZ.

Witnesses:
N. J. TALLMAN,
M. E. WATKINS.